United States Patent
Simanowski et al.

(10) Patent No.: US 11,448,288 B2
(45) Date of Patent: Sep. 20, 2022

(54) LEAF SPRING ROTATIONAL VIBRATION ABSORBER

(71) Applicant: Scientific Drilling International, Inc., Houston, TX (US)

(72) Inventors: Mario Simanowski, Meinersen (DE); Carsten Freyer, Wienhausen (DE)

(73) Assignee: SCIENTIFIC DRILLING INTERNATIONAL, INC., Houston, TX (US)

( * ) Notice: Subject to any disclaimer, the term of this patent is extended or adjusted under 35 U.S.C. 154(b) by 142 days.

(21) Appl. No.: 17/128,033

(22) Filed: Dec. 19, 2020

(65) Prior Publication Data

US 2022/0196110 A1   Jun. 23, 2022

(51) Int. Cl.
*E21B 17/04* (2006.01)
*F16F 15/121* (2006.01)
*F16F 15/167* (2006.01)

(52) U.S. Cl.
CPC .......... *F16F 15/1215* (2013.01); *E21B 17/04* (2013.01); *F16F 15/167* (2013.01)

(58) Field of Classification Search
CPC ...... F16F 7/108; F16F 15/1215; F16F 15/167; F16F 15/12; E21B 17/04; E21B 17/07
See application file for complete search history.

(56) References Cited

U.S. PATENT DOCUMENTS

| | | | |
|---|---|---|---|
| 4,133,516 A * | 1/1979 | Jurgens | E21B 17/07 175/321 |
| 7,025,681 B2 * | 4/2006 | Geislinger | F16F 15/10 464/82 |
| 11,142,962 B2 * | 10/2021 | Simanowski | F16F 7/108 |
| 2007/0289778 A1 * | 12/2007 | Watkins | E21B 28/00 175/40 |
| 2012/0228028 A1 * | 9/2012 | Turner | E21B 44/00 175/56 |
| 2014/0151122 A1 * | 6/2014 | Venugopal | E21B 17/073 175/40 |
| 2017/0342781 A1 * | 11/2017 | Reimers | E21B 17/073 |
| 2019/0284881 A1 * | 9/2019 | Hohl | E21B 17/073 |
| 2021/0189806 A1 * | 6/2021 | Simanowski | F16F 7/112 |
| 2022/0195813 A1 * | 6/2022 | Simanowski | E21B 41/00 |

* cited by examiner

*Primary Examiner* — Thomas W Irvin
(74) *Attorney, Agent, or Firm* — Ewing & Jones, PLLC

(57) ABSTRACT

A vibration damping device for use with a downhole tool having a tool axis and a drill string component (DSC), may comprise an inertia ring rotatably mounted on the DSC and including at least one cutout defining a chamber therein such that the DSC forms an end wall of the chamber, and a leaf spring disposed in the chamber, the leaf spring having first and second spring ends, the first end being attached to the inertia ring or the DSC such that relative rotation between the inertia ring and the DSC distorts the leaf spring. The second spring end may engage the other of the inertia ring or the DSC. A fluid may be included in the chamber and the spring may divide the chamber into two portions, so that relative rotation between the inertia ring and the DSC distorts the leaf spring and varies the volumes of the portions.

20 Claims, 9 Drawing Sheets

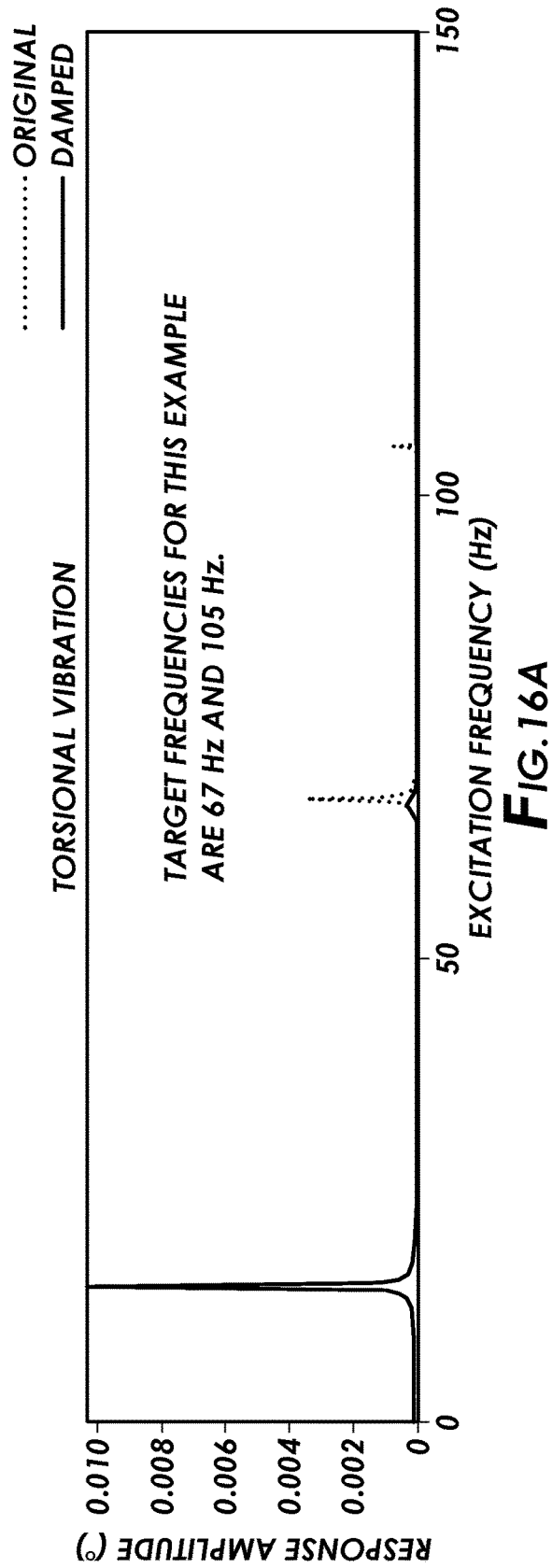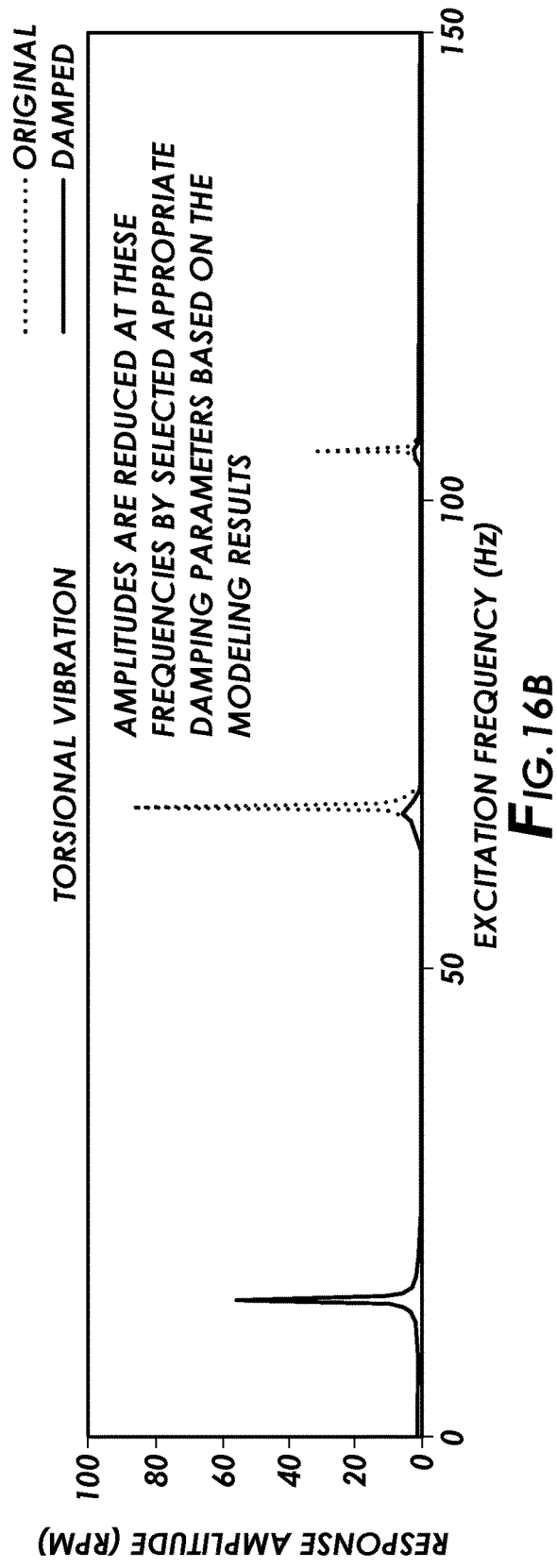

LEAF SPRING ROTATIONAL VIBRATION ABSORBER

CROSS REFERENCE TO RELATED APPLICATIONS

None.

TECHNICAL FIELD/FIELD OF THE DISCLOSURE

The present disclosure relates generally to damping vibrations or rotational oscillations during drilling operations using rotary steerable systems, and specifically to inertial damping systems converting vibration energy into heat energy, resulting in the desired damping effect.

BACKGROUND OF THE DISCLOSURE

In hydrocarbon drilling operations, boreholes are typically drilled by rotating a drill bit attached to the end of a drill string. The drill bit can be rotated by rotating the drill string at the surface and/or by a fluid-driven downhole mud motor, which may be part of a bottom hole assembly (BHA). For example, a mud motor may be used when directional drilling using a rotary steerable system (RSS). The combination of forces and moments applied by the drill string and/or mud motor and forces and moments resulting from the interaction of the drill bit with the formation can have undesirable effects on the drilling system, including reducing the effectiveness of the cutting action, damage to BHA components, reduction in BHA components life, and interference in measuring various drilling parameters.

SUMMARY

To mitigate such negative effects, a BHA may be equipped with a damping system to draw vibration energy from the BHA and thereby damping the effects associated with torsional vibration excitation.

A vibration damping device for use with a downhole tool that has a tool axis and includes a drill string component may comprise an inertia ring rotatably mounted on the drill string component and defining a radial interface therewith. The inertia ring may include at least one cutout defining a chamber therein, and the drill string component may form an end wall of the chamber. A leaf spring may be disposed in the chamber. The leaf spring may have a first spring end and a second spring end, and the first spring end may be fixedly attached to one of the inertia ring or the drill string component such that relative rotation between the inertia ring and the drill string component distorts the leaf spring. The second spring end may engage the other of the inertia ring or the drill string component. The device may further include at least one of a fluid and an elastomer in the chamber.

The leaf spring may divide the chamber into first and second chamber portions each having a volume. Relative rotation between the inertia ring and the drill string component may distort the leaf spring so as to vary the volumes of the first and second chamber portions. The inertia ring may include at least two chambers and an inter-chamber passage therebetween, the inter-chamber passage providing fluid communication between the chambers. At least one end of the leaf spring may be supported in an elastomeric member. The leaf spring may include at least one fluid flow passage therethrough, the fluid flow passage providing fluid communication between the first and second chamber portions.

The leaf spring may be configured to allow fluid communication between the first and second chamber portions around the leaf spring. Two or more leaf springs may be constructed so as to include a friction interface such that deformation of the two or more leaf springs results in friction at the friction interface.

The device may further include at least one of an axial bearing and a radial bearing between the inertia ring and the drill string component. The device may further include a stop mechanism that mechanically limits the degree of relative rotation between the inertia ring and the drill string component. The stop mechanism may comprise contact between the leaf spring and the inertia ring. The stop mechanism may limit relative rotation between the inertia ring and the drill string component to a maximum of 45 degrees.

The device may further include a housing, and the inertia ring may be disposed in the housing.

A vibration damping device for use with a downhole tool that has a tool axis and may include a drill string component may comprise an inertia ring rotatably mounted on the drill string component and defining a radial interface therewith. The inertia ring may include at least one cutout defining at least two chambers therein, and the drill string component may form an end wall and an inner wall of each chamber. A fluid may be disposed in the chamber and a leaf spring may be disposed in the chamber. The leaf spring may have a first spring end and a second spring end, and the first spring end may be fixedly attached to one of the inertia ring or the drill string component. The second spring end may engage the other of the inertia ring or the drill string component, and the leaf spring may divide the chamber into first and second chamber portions each having a volume. Relative rotation between the inertia ring and the drill string component may distort the leaf spring so as to vary the volumes of the first and second chamber portions. A stop mechanism may be included that mechanically limits the degree of relative rotation between the inertia ring and the drill string component. The leaf spring may include at least one fluid flow passage therethrough, the fluid flow passage providing fluid communication between the first and second chamber portions. The leaf spring may be configured to allow fluid communication between the first and second chamber portions around the leaf spring. The inertia ring may include at least two chambers and an inter-chamber passage therebetween, the inter-chamber passage providing fluid communication between the chambers. The device may further include at least one of an axial bearing and a radial bearing between the inertia ring and the drill string component. The stop mechanism may comprise contact between the leaf spring and the inertia ring.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 16A and 16B are plots of models illustrating damping of torsional vibration at target frequencies.

DETAILED DESCRIPTION

Figure 1:
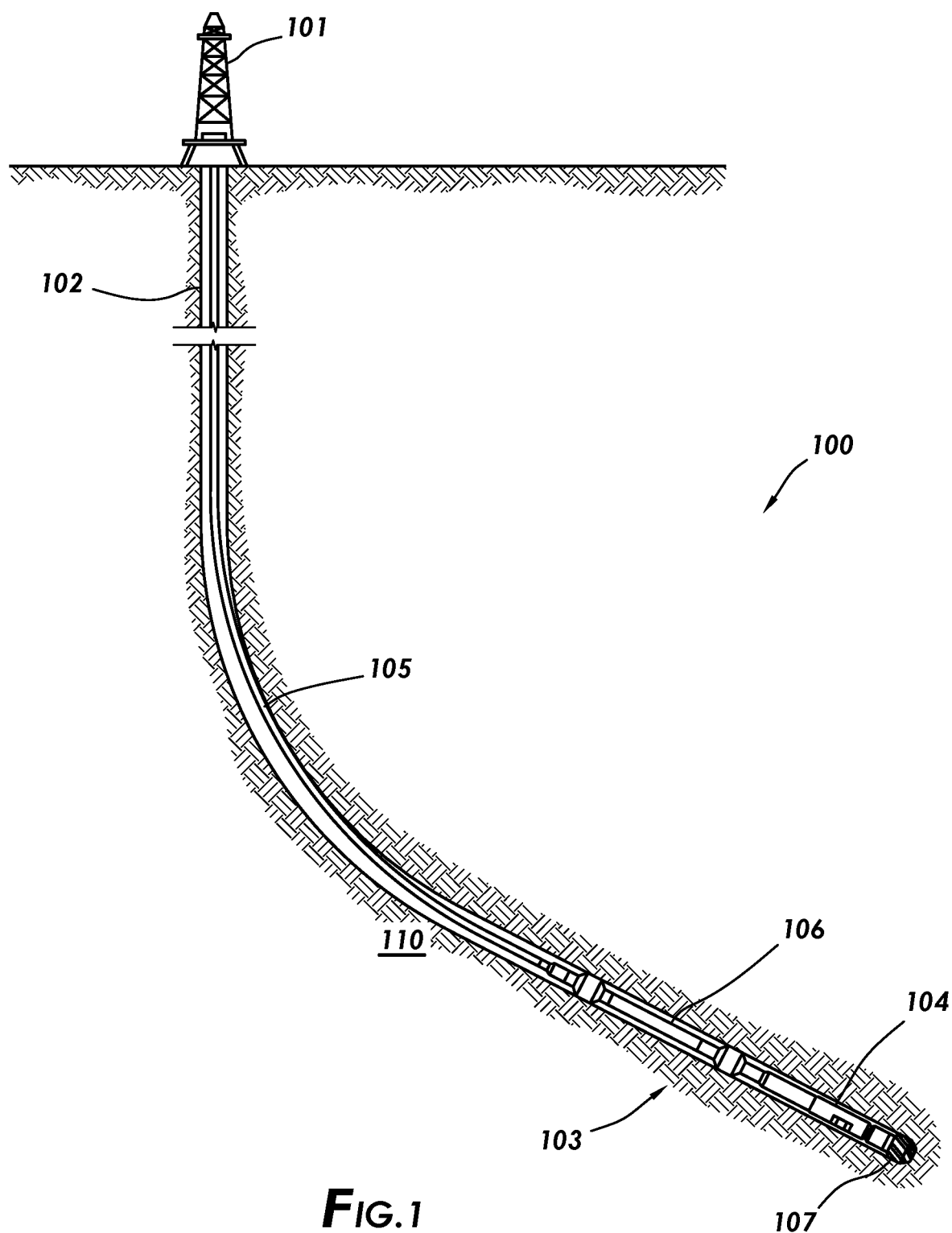
FIG. 1 is a schematic view of a drilling system in which embodiments of the current invention can be used.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present disclosure hereby includes the concepts and features described in U.S. Application Ser. No. 62/952,233, filed Dec. 21, 2019 and entitled "Method and Apparatus for Damping/Absorbing Rotational Vibrations/Oscillations," and U.S. Application Ser. No. 62/976,898, filed Feb. 14, 2020 and entitled "Method and Apparatus for Damping/Absorbing Rotational Vibrations/Oscillations," each of which is hereby incorporated herein in its entirety.

Referring initially to FIG. 1, a drilling system 100 in which the present apparatus may be used may include a drilling rig 101 positioned above a wellbore 102 that extends into a subsurface formation 110. A drill string 105 may extend from drilling rig 101 into wellbore 102 and may terminate in a bottom hole assembly (BHA) 103. Drill string 105 may be driven by the surface equipment of the rig. In some embodiments, BHA 103 may include a drill bit 107, a motor 106, which may be a mud motor or other downhole motor, and a steerable system 104, which may be a rotary steerable system (RSS). BHA 103 may optionally include various other devices, such as logging or measurement devices, communications devices, and the like. If present, steerable system 104 may be used to steer the bit as the wellbore is drilled. The rotational force (torque) required to rotate drill bit 107 can be provided a torque creating or applying apparatus, which may be a drill string 105, motor 106, or a combination thereof.

Figure 2:
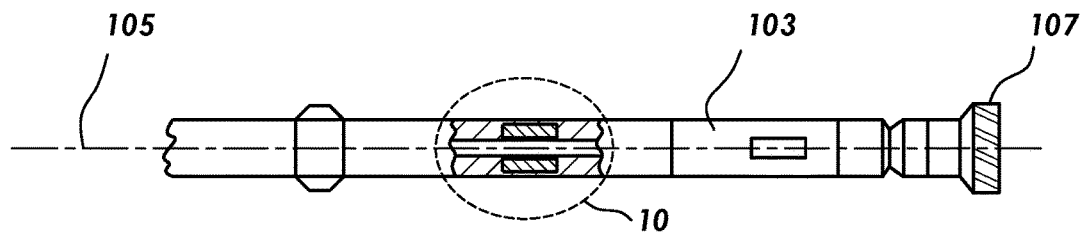
FIGS. 2-4 schematically illustrate possible locations for a damping device and its different setups for installation in a drilling system.
Figure 3:
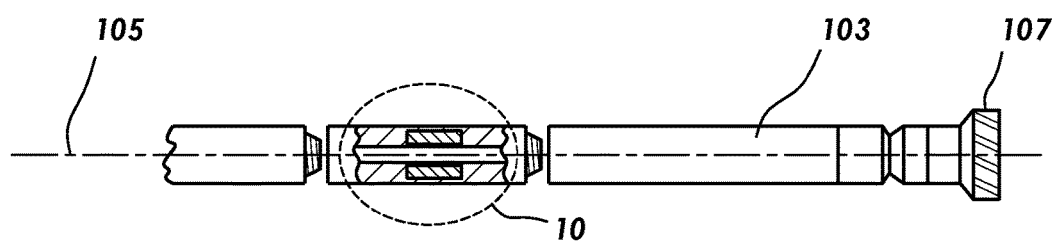
Figure 4:
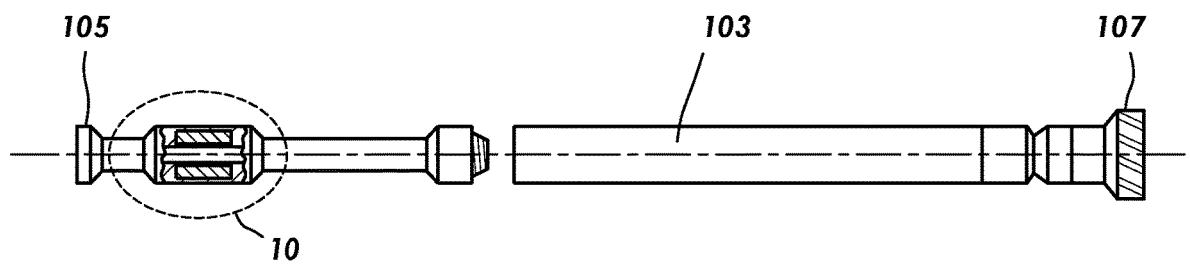

According to FIGS. 2-4, in some embodiments, one or more damping devices 10 may be positioned between the torque applying or creating apparatus and drill bit 107. By way of example only, a damping device 10 may be positioned between drill string 105 and drill bit 107 or between steerable system 104 and drill bit 107. Alternatively or additionally, a damping device may be part of the drill bit.

In FIG. 2, damping device 10 is integrated in BHA 103. In FIG. 3, damping device 10 is provided on one or more standalone subs as an add-on to BHA 103. FIG. 3 shows a "modular" device, in which the functional features can be selectively added or removed at a rigsite. FIG. 4 shows a setup in which the functional features are integrated into a different component of the BHA (e.g. a stabilizer or a flex sub). If the damping device is included (integrated) in the BHA, adding or removing the damping device at the rigsite is only possible if the entire BHA component is added or removed. The optimal position of the damping device depends on a multitude of parameters. Optimal efficacy is reached when placed at an anti-node of the respective modal-shape.

Figure 5:
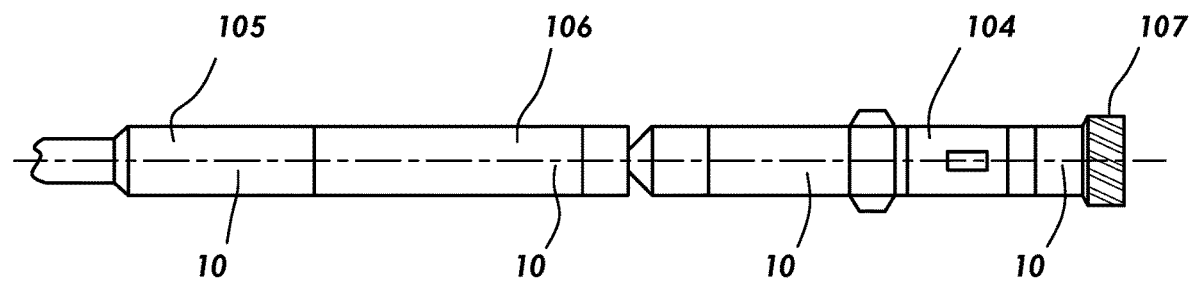
FIGS. 5-7 schematically illustrate additional possible locations for a damping device and its different setups for installation in a drilling system.
Figure 6:
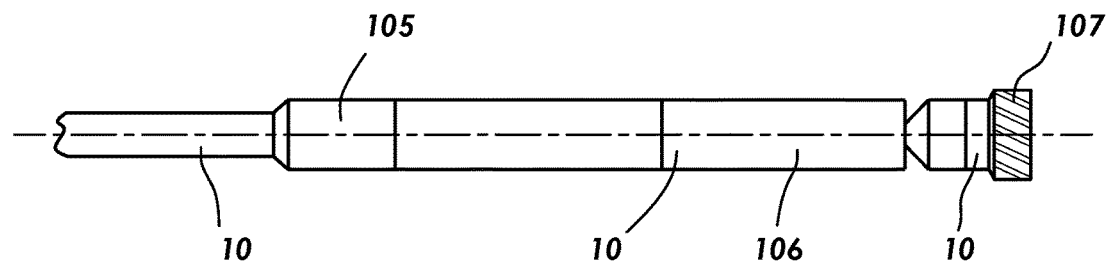
Figure 7:
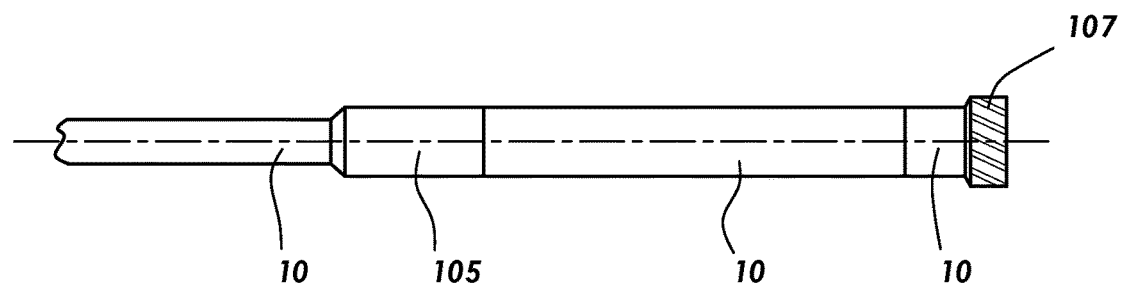

The damping device may be part of any BHA component. FIGS. 5-7 show various possible locations for the damping device 10 in the drillstring. Specifically, FIG. 5 shows several possible locations for the damping device 10 on a motor driven RSS BHA. FIG. 6 shows several possible locations for damping device 10 on a conventional motor driven BHA. FIG. 7 shows several possible locations for damping device 10 on a conventional BHA without motor and RSS.

Figure 8:
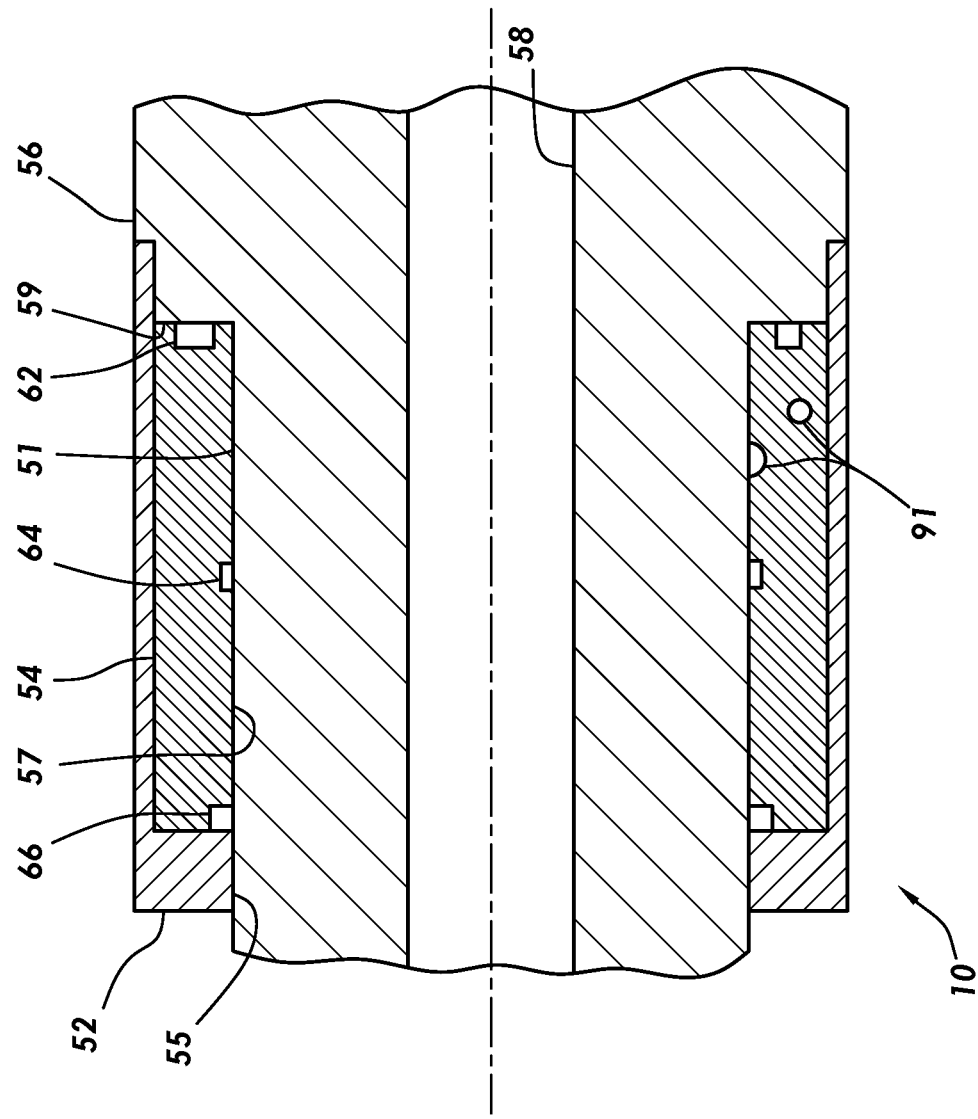
FIG. 8 is cross-section along lines 8-8 of FIG. 9.
Figure 9:
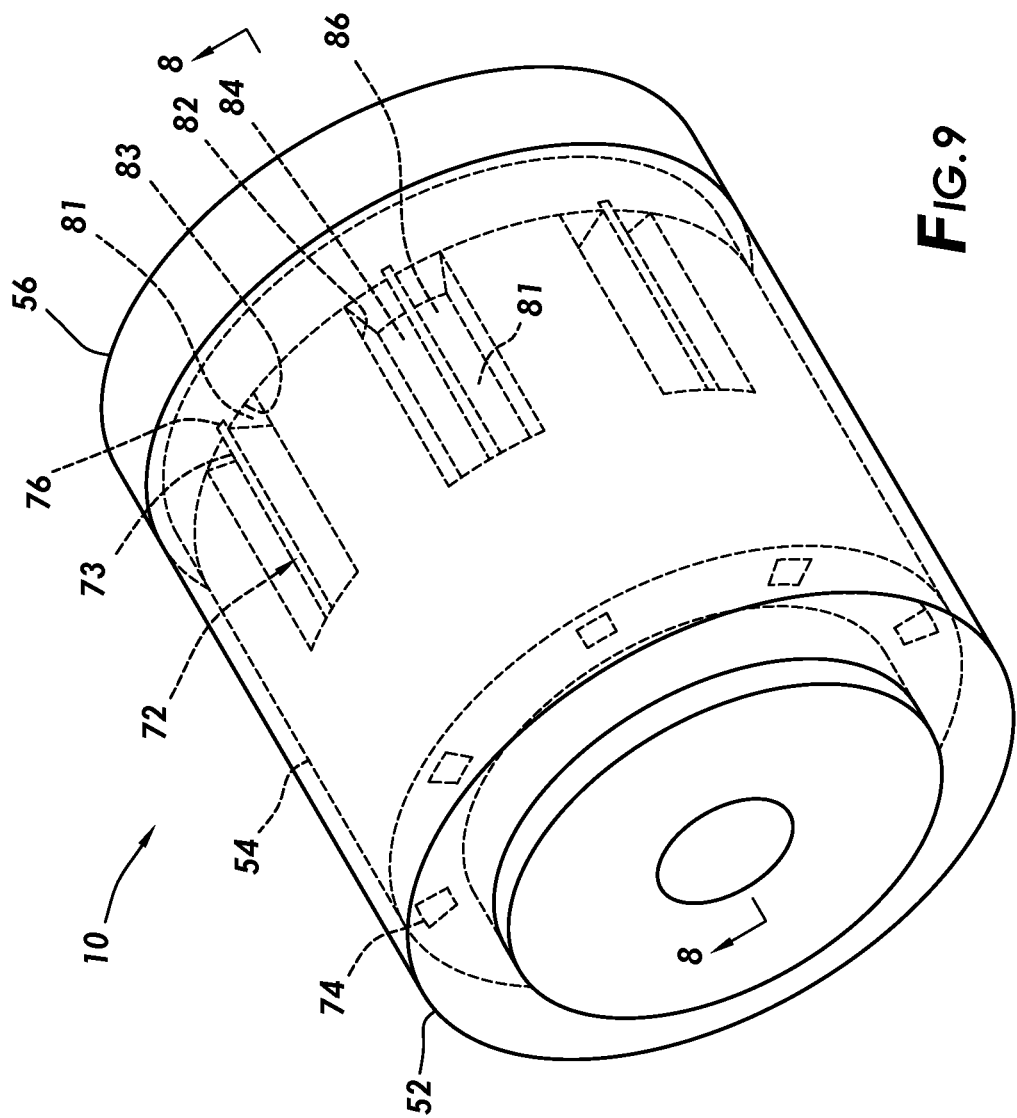
FIG. 9 is a view of a device in accordance with an embodiment of the invention.
Figure 10:
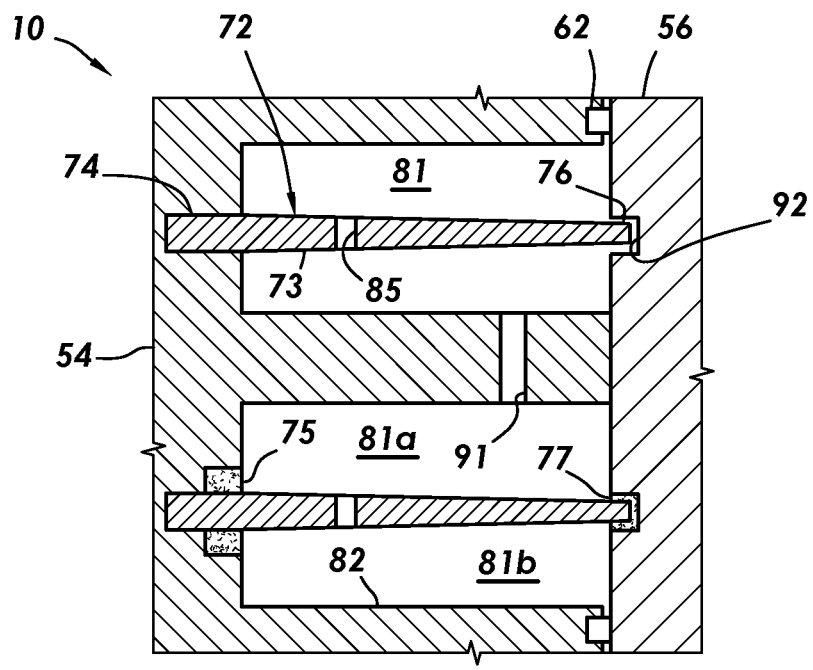
FIG. 10 is a cut away and unwound view of the device of FIGS. 8 & 9

Referring now to FIGS. 8-10, some embodiments of damping device 10 may comprise a housing 52 and an inertia ring 54. Housing 52 and an inertia ring 54 may be rotatably mounted on a drill string component 56. Drill string component 56 includes an axial bore 58 therethrough for the transmission of drilling fluids.

Housing 52 encloses inertia ring 54 so as to isolate and protect inertia ring 54 from fluids in the annulus between the drill string and the borehole wall. Housing 52 may be any material suitable for downhole use. Housing 52 may include a generally cylindrical body having an axial bore 55 that receives inertia ring 54 and drill string component 56. Inertia ring 54 may also include a generally cylindrical body having an axial bore 57 that receives drill string component 56 and defines a radial interface 51 therewith. One end of inertia ring 54 abuts a portion of drill string component 56 and defines an axial interface 59 therewith.

One or more of axial bearings 62, radial bearings 64, and axial/radial bearings 66 may be included between inertia ring 54 and drill string component 56 or housing 52. Axial bearings 62 and axial/radial bearings 66 may be positioned at axial interface 59 and radial bearings 64 may be positioned at radial interface 51. If present, axial bearings 62, radial bearings 64, and axial/radial bearings 66 serve to facilitate rotational, longitudinal, and both types of movement, respectively, of inertia ring 54 relative to drill string component 56.

Referring particularly to FIGS. 9 and 10, the end of inertia ring 54 that is adjacent to drill string component 56 may include one or more cutouts 82. Each cutout 82 defines a chamber having an end wall 83 formed by the drill string component 56. If a plurality of cutouts 82 are provided, as illustrated, cutouts 82 may be evenly spaced about the circumference of inertia ring 54.

In some instances housing 52 may form the outer wall of each chamber 81, as illustrated in FIG. 9. If cutouts 82 extend through the thickness of inertia ring 54, the drill string component 56 may form the inner wall of each chamber 81. If cutouts 82 do not extend through the thickness of inertia ring 54, inertia ring 54 may form the inner wall of each chamber 81.

Inertia ring 54 may include one or more leaf springs 72. The number of chambers 81 and leaf springs 72 may vary.

It is not necessary to include a leaf spring in every chamber and it may be desired to provide more than one leaf spring in a chamber.

Each leaf spring 72 may include a body 73 having a first end 74 fixedly attached to inertia ring 54 and a second end 76. Body 73 may comprise a material that is more or less flexible than the material forming inertial ring 54. In some instances, body 73 may be constructed so as to have enhanced energy-absorption upon deformation. In some embodiments, enhanced energy-absorption upon deformation may be provided by including a friction interface such that deformation of the leaf springs results in friction at the friction interface. By way of example, a friction interface may be provided by forming one or more leaf springs from laminated layers of one or more materials, and/or by positioning one or more pairs of adjacent leaf springs such that deformation results in friction between the springs.

Body 73 may be tapered along its length, with one end being thicker and therefore less flexible than the other end. Body 73 may be generally planar or may have a curved, wavy, or other shape. Second end 76 extends into chamber 81. In some embodiments, including as illustrated, leaf spring 72 may extend along the length of chamber 81 and second end 76 may engage drill string component 56. Second end 76 may be fixedly attached to drill string component 56 or may floatingly engage drill string component 56, as described below. In some embodiments, one or both ends 74, 76 of leaf spring 72 may be supported in an optional elastomeric member 75, 77, respectively. Engagement of leaf spring 72 with elastomeric members 75, 77, if present, may increase amount of rotational energy that can be absorbed by damping device 10.

Leaf spring 72 divides chamber 81 into first chamber portion 81a and second chamber portion 81b. Alternatively, and as described below, leaf spring 72 may be fixedly attached to drill string component 56 and loosely attached to inertia ring 54 without altering the functionality.

Leaf spring 72 may extend radially between the inner and outer walls of chamber 81. In embodiments in which leaf spring 72 occupies the entire radial distance between the inner and outer walls of chamber 81, one or more flow passages 85 (shown in phantom) may extend through body 73 so as to provide fluid communication between first chamber portion 81a and second chamber portion 81b. In embodiments in which leaf spring 72 does not occupy the entire radial distance between the inner and outer walls of chamber 81, the resulting gap(s) between leaf spring 72 and the inner and/or outer walls of chamber 81 may provide fluid communication between first chamber portion 81a and second chamber portion 81b.

Figure 11:
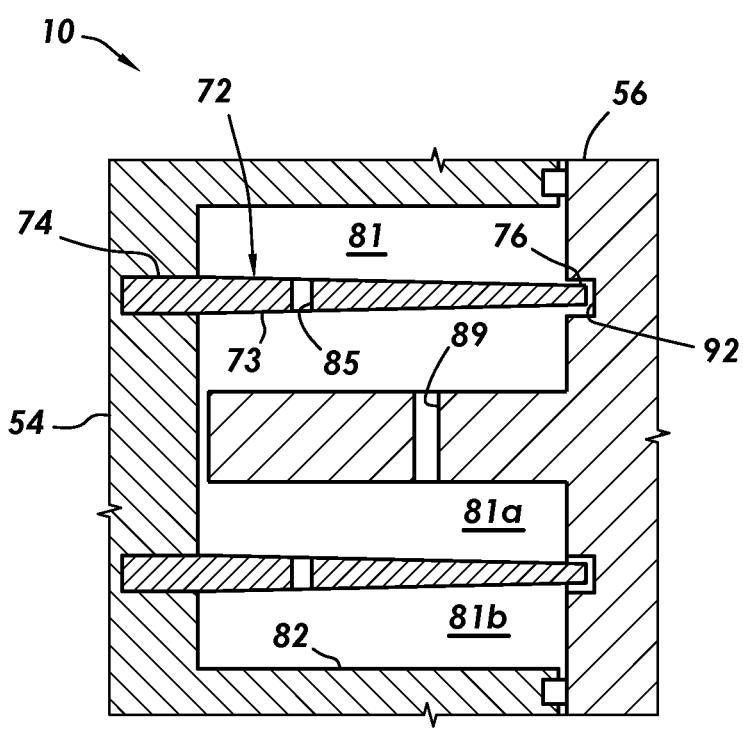
FIG. 11 is a cut-away and unwound view of a device in accordance with another embodiment of the invention.

Alternatively or in addition, drill string component 56 and/or inertia ring 54 may be configured so as to allow fluid communication between adjacent chambers 81. By way of example, inertia ring 54 may include one or more inter-chamber passages 91 extending between adjacent chambers 81 as illustrated in phantom alternative configurations in FIGS. 8 and 10. Inter-chamber passage 91 may be adjacent to drill string component 56, may comprise a bore through a portion of inertia ring 54, or may be adjacent to housing 52. Alternatively or in addition, as illustrated in FIG. 11, one or more flow passages 89 (shown in phantom) may extend through drill string component 56 so as to provide fluid communication between adjacent chambers 81.

Chamber 81, comprising first chamber portion 81a and second chamber portion 81b, may be filled with a fluid. The fluid may be a specifically selected damping fluid, such as a viscous medium including, for example, silicone oil. The damping fluid may have a high viscosity, such as for example up to 1,000,000 cSt at 25° C. In some embodiments, housing 52 may include ports and/or channels (not shown) for evacuating or filling chamber 81 with damping fluid.

The first end 74 of each leaf spring 72 may be fixedly attached to inertia ring 54. In some embodiments, first end 74 extends longitudinally substantially into or through inertia ring 54. Leaf spring 72 may be, for example press-fit into engagement with inertia ring 54. The second end of each leaf spring 72 may or may not be fixedly attached to drill string component 56. As illustrated in FIG. 10, second end 76 may be received in a channel 92 in drill string component 56. Rather than being fixedly attached to drill string component 56, second end 76 may be configured to engage drill string component 56 as set out below.

Figure 12:
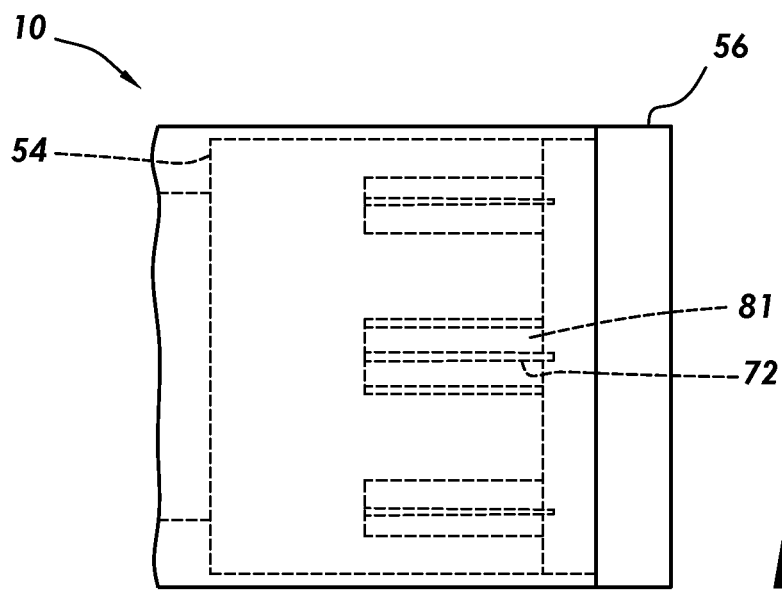
FIGS. 12-14 are top views with partial cutaways of one embodiment of the invention, illustrating different working positions (neutral, maximum right, maximum left).
Figure 13:
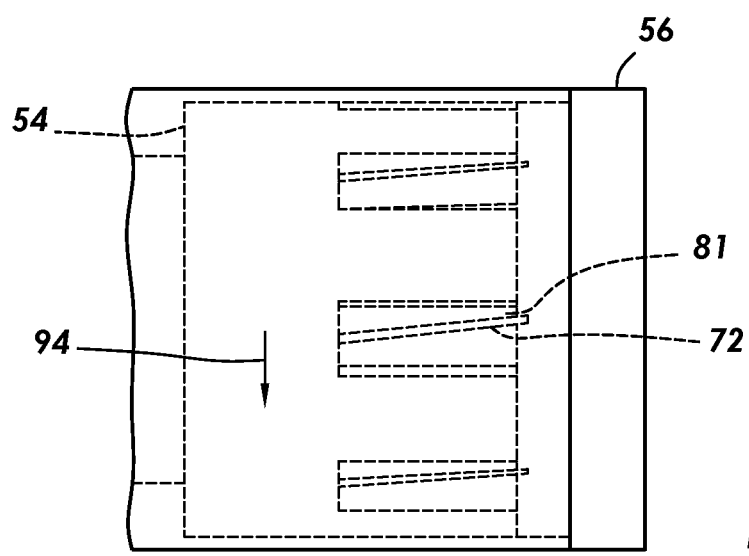
Figure 14:
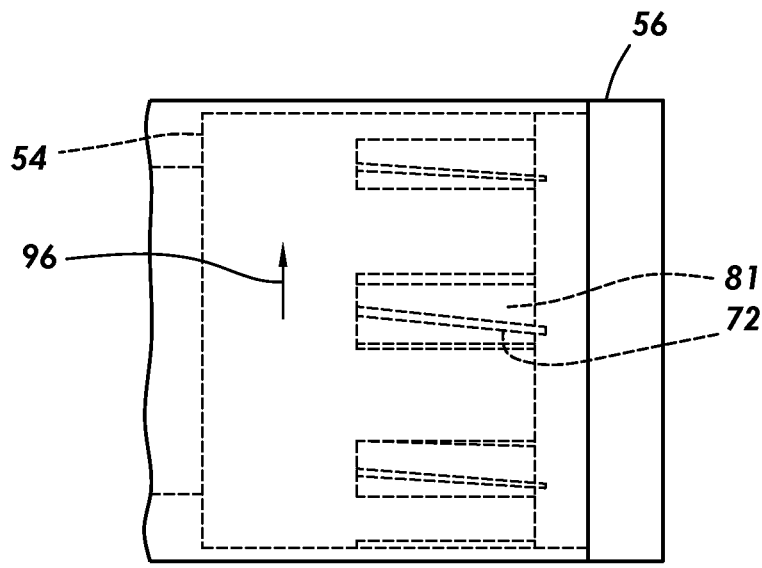
Figure 15:
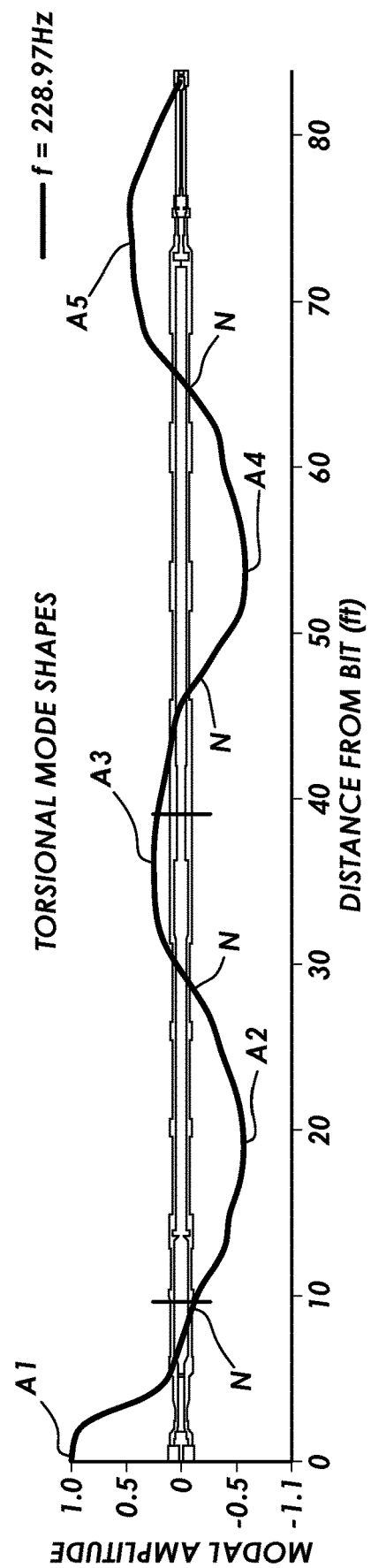
FIG. 15 is a schematic illustration of torsional vibrational nodes of part of a drill string.

Referring now to FIGS. 12-14, the operation of damping device 10 is illustrated. As drill string component 56 rotates in the borehole, such during drilling, it may be subject to torsional vibrations, which may result from friction. The torsional vibrations may cause inertia ring 54, which can rotate relative to drill string component 56, to oscillate between different azimuthal positions relative to drill string component 56. In FIG. 12, inertia ring 54 is in a neutral position. In FIG. 13, inertia ring 54 has rotated clockwise (when viewed in the forward direction along the drillstring) relative to drill string component 56, as indicated by arrow 94. In FIG. 14, inertia ring 54 has rotated counterclockwise relative to drill string component 56, as indicated by arrow 96. Rotation of inertia ring 54 relative to drill string component 56 causes leaf spring 72 to shift within chamber 81 because one end of each leaf spring 72 is affixed to inertia ring 54 while the other end engages drill string component 56. Movement or shifting of leaf spring 72 within chamber 81 changes the relative volumes of first and second chamber portions 81a, 81b. The resulting pressure differential causes fluid to flow from whichever chamber portion is shrinking to the chamber portion that is expanding. Fluid flow between chamber portions and/or between adjacent chambers may be via any one or more of the fluid flow paths described above. During oscillation, fluid may flow back and forth between first and second chamber portions 81a, 81b. Friction within the fluid and between the fluid and the solid components of damping device 10 converts some of the vibrational energy into heat, thereby damping the oscillation.

If the second end 76 of leaf spring 72 is not attached to drill string component 56 and instead floats in a groove or channel 92, channel 92 and second end 76 may be configured so that there is some degree of free relative movement. By way of example, the interface between second end 76 of leaf spring 72 may restrict relative tangential movement while allowing some axial and/or lateral relative movement.

A relative rotation of the two parts connected by the spring may cause the leaf spring to bend. Alternatively, second end 76 may be attached to or constrained by engagement with drill string component 56 and may or may not be fixedly attached to inertia ring 54. Regardless, a cyclical distortion of leaf spring 72 may serve as an additional energy-dissipating mechanism, thereby increasing the effectiveness of damping device 10.

In some embodiments, a stop mechanism (not shown) may be included in damping device 10. The stop mechanism may be a boss, tab, ridge, groove, sleeve, slot, and/or channel that mechanically limits the degree of relative rotation between inertia ring 54 and drill string component 56. In some instances, rotation of inertia ring 54 relative to drill string component may be limited by contact between leaf spring 72 and inertia ring 54. In some instances, it may be desired to limit relative rotation between inertia ring 54 and drill string component 56 to 45 degrees or less.

In some instances, it may be desired to include one or more adjustable flow restrictors in one or more of the fluid flow paths. Higher restriction causes higher damping and a stiffer characteristic. The desired damping characteristic may be tunable and may require an adjustment of one or more factors including but not limited to restriction, fluid viscosity, spring stiffness, inertia, and the like. In some embodiments, it may be desirable to provide a magnetorheological fluid in chambers 81 and to adjust the properties of the magnetorheological fluid by applying a variable magnetic field across all or a portion of damping device 10.

In some embodiments, all or a portion of one or more chambers 81 may be also occupied by an elastomer or one or more elastomeric bodies. The elastomer may have specific elastic and damping properties so that it can deform and dissipate energy while deforming. For both choices (a high viscosity fluid and an elastomer) it is required that the molecular chains of the material move relative to each other so as to dissipate energy.

Referring again to FIGS. 2-7, a damping device 10 can be used to increase the reliability of an RSS and/or components of the RSS or BHA. Damping device 10 is especially advantageous in operations that have no designated vibration damping drill string component. Damping device 10 can be integrated into a drill string as a separate device, and/or as a separate device positioned within another drill string member (cartridge), or by integrating its components into a torque-transmitting member of the drill string.

In some embodiments, damping device 10 can be tuned to at least one torsional natural frequency of the tool or component it is intended to protect, which may include, for example, the BHA, RSS, or other components of the RSS. In these embodiments, the tool or component is modeled and its natural frequency(ies) is(are) calculated.

According to some embodiments, damping device 10 can be adapted to a drill string or component thereof using the following steps:
  a) Calculate the torsional natural frequencies, also referred to as Eigen Values or eigenfrequencies, and mode shapes (Eigen Vectors) based on the mechanical properties of the BHA (ODs, IDs, Lengths, and Material Properties). The calculation may be based on a finite elements analysis or the like. Boundary conditions may be selected such that the system being examined is free to rotate at one end and can be fixed, free, or weakly supported at the opposite end.
  b) Tune the damping device characteristics to match the desired frequencies. Each damping device 10 will have frequency dependent damping properties; tuning entails adjusting the frequency dependent damping properties of the device to correspond to the at least one desired frequency. The frequency dependent damping properties can be adjusted by adjusting one or more parameters including the inertia (mass, material density, lever to axis of rotation, etc.) and damping characteristics (type of fluid, fluid viscosity, shear gap width, shear gap length, coefficient of friction, preload, etc.) of the damping device. In some instances, the target frequency may be from 30 Hz up to 1000 Hz. The tuning may be carried out empirically or using mathematical models.
  c) Use the calculated mode shapes to select a location for the damping device. As illustrated schematically in FIG. 17, for a given tool and frequency, a mathematical model can be used to calculate the amplitude of vibration at each point along the tool. As illustrated in FIG. 17, the amplitude will tend to vary between antinodes A1, A2, A3 . . . , i.e. points along the Eigen Vector in which the amplitude is a local maximum or minimum, along the length of the tool, with a node N (zero value) between each pair of adjacent antinodes. Depending on the tool, the antinodes may increase or diminish in amplitude along the length of the tool, with the greatest amplitude (greatest maximum) being closest to one end of the tool.

In some embodiments, it may be advantageous to position a damping device 10 at each of one or more anti-nodes. In some instances, it may be desirable to position a damping device 10 close to or at the point with the largest absolute value of modal displacement. FIG. 16 illustrates damping of torsional vibration measured in degrees (FIG. 16A) and rpm (FIG. 16B).

A system including one or more damping devices may be configured to damp vibrations at one or more frequencies. In some embodiments, damping devices tuned to different frequencies can be used to damp multiple (separate) frequencies. In other embodiments, a single damping device that is capable of damping a broad range of frequencies can be used. The effective frequency range of a damping device can be influenced by various parameters, as set out above.

The purpose of the present damping device is to protect the BHA, or certain parts of said BHA, from torsional vibrations that exceed detrimental magnitudes. In some instances, the device may be used for damping loads that occur during drilling operation, such as torque peaks and/or torsional accelerations/oscillations. A drilling system may include one or a plurality of said damping devices in different locations. The damping device can be an integral part of the BHA or one of its components, where all needed elements are integrated into readily available tools. It can also be added to the BHA as a separate device (module), where all elements are integrated into a tool on its own.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art may readily use the present disclosure as a basis for designing or modifying other processes and structures for carrying out the same purposes and/or achieving the same advantages of the embodiments introduced herein. One of ordinary skill in the art may make various changes, substitutions, and alterations without departing from the scope of the present disclosure.

What is claimed is:

1. A vibration damping device for use with a downhole tool, the downhole tool having a tool axis and including a drill string component, the vibration damping device comprising:
  an inertia ring rotatably mounted on the drill string component and defining a radial interface therewith, the inertia ring including at least one cutout defining a chamber therein, wherein the drill string component forms an end wall of the chamber;
  a leaf spring disposed in the chamber, wherein the leaf spring has a first spring end and a second spring end, wherein the first spring end is fixedly attached to one of the inertia ring or the drill string component such that relative rotation between the inertia ring and the drill string component distorts the leaf spring.

2. The device of claim 1 wherein the second spring end engages the other of the inertia ring or the drill string component.

3. The device of claim 2 wherein the leaf spring divides the chamber into first and second chamber portions each having a volume, and wherein relative rotation between the inertia ring and the drill string component distorts the leaf spring so as to vary the volumes of the first and second chamber portions.

4. The device of claim 2 wherein the inertia ring includes at least two chambers and an inter-chamber passage therebetween, the inter-chamber passage providing fluid communication between the chambers.

5. The device of claim 2 wherein at least one end of the leaf spring is supported in an elastomeric member.

6. The device of claim 2 wherein the leaf spring includes at least one fluid flow passage therethrough, the fluid flow passage providing fluid communication between the first and second chamber portions.

7. The device of claim 2 wherein the leaf spring is configured to allow fluid communication between the first and second chamber portions around the leaf spring.

8. The device of claim 2 wherein two or more leaf springs are constructed so as to include a friction interface such that deformation of the two or more leaf springs results in friction at the friction interface.

9. The device of claim 2, further including at least one of an axial bearing and a radial bearing between the inertia ring and the drill string component.

10. The device of claim 2, further including a stop mechanism that mechanically limits the degree of relative rotation between the inertia ring and the drill string component.

11. The device of claim 10 wherein the stop mechanism comprises contact between the leaf spring and the inertia ring.

12. The device of claim 10 wherein the stop mechanism limits relative rotation between the inertia ring and the drill string component to a maximum of 45 degrees.

13. The device of claim 1, further including at least one of a fluid and an elastomer in the chamber.

14. The device of claim 1, further including a housing, wherein the inertia ring is disposed in the housing.

15. A vibration damping device for use with a downhole tool, the downhole tool having a tool axis and including a drill string component, the vibration damping device comprising:
an inertia ring rotatably mounted on the drill string component and defining a radial interface therewith, the inertia ring including at least one cutout defining at least two chambers therein, wherein the drill string component forms an end wall and an inner wall of each chamber,
a fluid disposed in the chamber;
a leaf spring disposed in the chamber, wherein the leaf spring has a first spring end and a second spring end, wherein the first spring end is fixedly attached to one of the inertia ring or the drill string component, wherein the second spring end engages the other of the inertia ring or the drill string component, and wherein the leaf spring divides the chamber into first and second chamber portions each having a volume, and wherein relative rotation between the inertia ring and the drill string component distorts the leaf spring so as to vary the volumes of the first and second chamber portions; and
a stop mechanism that mechanically limits the degree of relative rotation between the inertia ring and the drill string component.

16. The device of claim 15 wherein the leaf spring includes at least one fluid flow passage therethrough, the fluid flow passage providing fluid communication between the first and second chamber portions.

17. The device of claim 15 wherein the leaf spring is configured to allow fluid communication between the first and second chamber portions around the leaf spring.

18. The device of claim 15 wherein the inertia ring includes at least two chambers and an inter-chamber passage therebetween, the inter-chamber passage providing fluid communication between the chambers.

19. The device of claim 15, further including at least one of an axial bearing and a radial bearing between the inertia ring and the drill string component.

20. The device of claim 15 wherein the stop mechanism comprises contact between the leaf spring and the inertia ring.

* * * * *